(12) United States Patent
Mehrotra et al.

(10) Patent No.: US 7,431,862 B2
(45) Date of Patent: Oct. 7, 2008

(54) SYNTHESIS OF MAGNETIC, DIELECTRIC OR PHOSPHORESCENT NANO COMPOSITES

(75) Inventors: Vivek Mehrotra, Simi Valley, CA (US); Ira Goldberg, Thousand Oaks, CA (US)

(73) Assignee: ColdWatt, Inc., Austin, TX (US)

( * ) Notice: Subject to any disclaimer, the term of this patent is extended or adjusted under 35 U.S.C. 154(b) by 0 days.

(21) Appl. No.: 10/837,552

(22) Filed: Apr. 30, 2004

(65) Prior Publication Data

US 2005/0245658 A1 Nov. 3, 2005

(51) Int. Cl.
- C09K 11/02 (2006.01)
- C09K 11/54 (2006.01)
- H01F 1/055 (2006.01)
- H01F 1/147 (2006.01)
- H01F 1/28 (2006.01)

(52) U.S. Cl. ............ 252/62.54; 252/62.55; 252/301.36; 252/301.6 R; 523/200; 524/440; 524/430; 524/431; 524/432; 524/435

(58) Field of Classification Search ........................ None
See application file for complete search history.

(56) References Cited

U.S. PATENT DOCUMENTS

| | | | | |
|---|---|---|---|---|
| 3,740,266 A | * | 6/1973 | Akashi et al. ............... | 428/328 |
| 4,239,637 A | * | 12/1980 | Naruse ..................... | 252/62.54 |
| 4,474,866 A | * | 10/1984 | Ziolo ....................... | 430/106.2 |
| 5,322,756 A | * | 6/1994 | Ziolo ........................ | 430/114 |
| 5,714,536 A | * | 2/1998 | Ziolo et al. ................. | 524/430 |
| 5,770,110 A | * | 6/1998 | Schrell et al. ........... | 252/301.36 |
| 6,048,920 A | * | 4/2000 | Ziolo et al. ................ | 524/435 |
| 6,107,233 A | | 8/2000 | Harmer et al. ............. | 502/159 |
| 6,451,220 B1 | * | 9/2002 | Ziolo et al. ............. | 252/62.54 |
| 2004/0072015 A1 | * | 4/2004 | Seita et al. ................ | 428/689 |

OTHER PUBLICATIONS

Ziolo et al, "Matrix-Mediated Synthesis of nanocrystalline gamma-Fe2O3: A New Optically Trnasparent Magnetic Material", Science, vol. 257, pp. 219-223, Jul. 1992.*

Suber et al, "Synthesis, and structural and morphological characterization of iron oxide-ion-exchange resin and -cellilose nanocmposites", Appl. Organometal. Chem., 15, pp. 414-420, 2001.*

Shahinpoor et al , Ionic polymer-metal composites: I. Funametals, Smart Mater. Struct, vol. 10, 2001, pp. 819-833.*

Raymond et al, "In Situ Synthesis of Ferrites in Cellilocics", Chem. Mater. 1994, 6, 249-55.*

Shahinpoor et al, *Ionic Polymer-Metal Composites:I. Fundamentals*, Institute of Physics Publishing Ltd., 2001, pp. 819-833.

(Continued)

*Primary Examiner*—C. Melissa Koslow
(74) *Attorney, Agent, or Firm*—Slater & Matsil, L.L.P.

(57) ABSTRACT

A method of forming nano composites within a polymer structure comprises exposing a wettable polymer having ion-exchangeable groups pendant therefrom to an aqueous solution of a soluble salt containing metal ions, the metal ions replacing, by ion exchange, the pendant groups on the polymer. After ion exchange the polymer is exposed to a reducing agent forming metal oxides trapped within the polymer structure.

26 Claims, 7 Drawing Sheets
(1 of 7 Drawing Sheet(s) Filed in Color)

OTHER PUBLICATIONS

Clive Forder, et al, *Preparation and Characterisation of Superparamagnetic Conductive Polyester Textile Composites*, J. Mater.Chem., Mar. 1993(6), 561-569.

Lan Zhang et al, *Generation of Magnetic Metal Particles in Zeolite by Borohydride Reduction at Ambient Temperature*, J. Mater.Chem., Jun. 1996(6) 999-1004.

Lorenza Suber et al, *Synthesis, and Structural and Morphological Characterization of Iron Oxide-Ion-Exchange Resin and—Cellulose Nanocomposites*, Applied Organometallic Chemistry 2001;15:414-420.

Ronald F. Ziole,et al, *Matrix-Mediated Synthesis of Nanocrystalline Y-FE2O3: A New Optically Transparent Magnetic Material*, American Association for the Advancement of Science, Jul. 10, 1992, vol. 257, pp. 219-223.

Freitag, W.O., et al., "Composition and Stability of Iron Powders Prepared by a Borohydride Process," J. Appl. Phys., Nov. 1979, pp. 7801-7803, vol. 50, No. 11, American Institute of Physics.

Raymond, L., et al., "In Situ Synthesis of Ferrites in Cellulosics," Chem. Mater., 1994, pp. 249-255, vol. 6, No. 2, American Chemical Society.

Sourty, E., et al., "Ferrite-Loaded Membranes of Microfibrillar Bacterial Cellulose Prepared by in Situ Precipitation," Chem. Mater., 1998, pp. 1755-1757, vol. 10, No. 7, American Chemical Society.

Uehori, T., et al., "Magnetic Properties of Iron-Cobalt Alloy Particles for Magnetic Recording Media," IEEE Transactions on Magnetics, Sep. 1978, pp. 852-854, vol. MAG-14, No. 5, IEEE.

* cited by examiner

SYNTHESIS OF MAGNETIC, DIELECTRIC OR PHOSPHORESCENT NANO COMPOSITES

This invention relates to a simple technique for the synthesis of magnetic nanocomposites. The technique is based on ion exchange and precipitation within a polymer matrix. The matrix could be in the form of powders, fibers, tubes and self-supported films or other three dimensional structures.

BACKGROUND OF THE INVENTION

Prior attempts to prepare magnetic nanocomposites have utilized ground or milled particles of magnetic materials which were then dispersed in a carrier matrix, coated onto fabrics or added to finely ground, dispersed resins or zeolites. For example, Forder, et al. ("Preparation and Characterization of Superparamagnetic Conductive Polyester Textile Composites", *J. Mater. Chem.*, 3 (6) pp 563-569 (1992)) describes the preparation of magnetic colloids which are then coated onto the surface of a polyester fabric. Zhang, et al. ("Generation of Magnetic Metal Particles in Zeolite by Borohydride Reduction at Ambient Temperature", *J. Mater. Chem.*, 6(6) pp 999-1004 (1996)) treats sodium mordenite, a form of the naturally occurring zeolite designated hydrated calcium sodium potassium aluminum silicate, with a water soluble salt of a metal, $M^{2+}$, where M is iron, cobalt or nickel, to replace $Na^+$ on the resin with the metal ion. An aqueous suspension of the resin is then reacted with $NaBH_4$ to reduce the metal ion to the metal M, which remains within the resin particles.

Ziolo, et al., (Ziolo, R. F., E. P. Giannelis, B. A. Weinstein, M. P. O'Horo, B. N. Ganguly, V. Mehrotra, M. W. Russell, and D. R. Huffman, "*Matrix mediated synthesis of $Fe_2O_3$: A new optically transparent magnetic material*", Science 257:219-23 (1992)), reported on the preparation of $Fe_2O_3$ nanoparticles in sulfonated polystyrene-type 50-100 micron beads of ion exchange resin. They then had to be molded into monolithic structures at temperatures which modify the properties and characteristics of the nanoparticles. Sourty, et al., ("*Ferrite-LoadED Membranes of Microfibrillar Bacterial Cellulose Prepared by in situ Precipitation*", E. Sourty, D. H. Ryan and R. H. Marchessault, *Chem. Mater.*, 10(7), 1755-7(1998)) and Raymond, et al., ("*In Situ Synthesis of Ferrites in Cellulosics*," L. Raymond, J.-F. Revol, D. H. Ryan, R. H. Marchessault; *Chem. Mater.*; 6(2); 249-255 (1994)) describe the formation of ferrites in cellulosics. Suber, et al. ("*Synthesis, and Structural and Morphological Characterization of Iron oxide-Ion-Exchange Resin and-Cellulose Nanocomposites*", *Applied Organometallic Chemistry*, 15, 414-420 (2001)) reports on further studies of such materials. Shahinpoor, et al. reports on the treatment of ion exchange resins, such as Nafion with platinum salts to deposit platinum on or in the matrix ("*Ionic Polymer-Metal Composites: I. Fundamentals*," *Smart Mater. Struct.*, 10, 819-833 (2001).

Several patents have subsequently issued to Ziolo directed to magnetic nanocomposite compositions and processes for preparing these materials (U.S. Pat. No. 4,474,866, U.S. Pat. No. 5,714,536 and U.S. Pat. No. 6,148,920). In particular, these patents are directed to magnetic nanocomposite compositions containing nanocrystalline $Fe_3O_4$ particles formed in and stabilized by an ion binding polymeric matrix. In particular, granules of ion exchange polymer resin are suspended in a liquid and are then loaded with iron ions. The iron ions are then chemically converted to a magnetic oxide. For example, polystyrene-$(SO_3^-)_2Fe^{+2}$ resin is reacted with NaOH and $H_2O_2$ or $N_2H_4$ and NaOH to yield polystyrene-$(SO_3^-Na^+)_n$ plus gamma $Fe_2O_3$, the oxide being dispersed in the polymer matrix with particle sizes from about 0.0001 to about 0.1 microns in diameter. The end product is a very fine powder of the resin including the magnetic oxide for use as a toner for reprographic application.

Treatment of oxides with sodium borohydride has been used since the early '70s to produce the oxide of the metal and to form nanoparticles. However, they were not called "nanoparticles" at that time. (W. O. Freitag, T. A. Sharp, A. Baltz, and V. Suchodolski, *J. Appl. Phys.*, 50, pp. 7801-3 (1979), "*Composition of iron powders prepared by a borohydride process*," and T. Uehori, A. Hosaka, Y. Tokuoka, and Y. Imaoka, *IEEE Trans. Magn.* 14, pp. 852-4 (1978) "*Magnetic Properties of iron-cobalt alloy particles for magnetic recording media*."). The W. O. Freitag article points out that borohydride reduction methods have been well established, though not necessarily for nanoparticle alloys. Further, the nanoparticle alloys were not dispersed within the polymer structure.

U.S. Pat. No. 6,107,233 to Harmer is directed to the formation of spherically shaped porous microcomposites of perfluorinated ion-exchange resins with inorganic oxides dispersed starting there though from a mixture of a water miscible inorganic oxide and a water miscible ion-exchange resin. The mixture is then mixed with an organic liquid in which neither of the oxide or resin is soluble to create a dispersion of the water-miscible phase, in the form of spherical bubbles throughout the organic phase, followed by gelation of the water miscible components into spherical particles.

In general, nanomaterials can be fabricated with magnetic, magnetostrictive, or magneto-optic functionality. Phosphorescent nanocomposites have also been synthesized using the same technique. The nanocomposites can provide improved materials for various applications such as— a. magnetics for power converters b. actuators for artificial muscles, valves, micro-mirrors and micropumps c. magneto-optical wave guides and switches d. magnetics for guiding micro-catheters and for drug delivery e. magnetodielectric materials for microwave and RF devices f. applications requiring functional conformable materials, controlled displacement or positioning devices including macro and micro devices.

SUMMARY OF THE INVENTION

Magnetic nanocomposites and methods of preparing those nanocomposites from precursor materials are described. Suitable precursor substrate materials include film, membranes, fibers or fabrics of ionomeric or cellulosic polymers. Metallic ions which can be deposited as nanocomposites in these substrates include iron, cobalt, nickel, magnesium, and zinc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Various different wettable polymers can be used as starting materials. These polymer materials may be provided in a wide range of forms including, but not limited to films, pellets, powders, fibers, fabrics and coatings on supporting materials. For illustrative purposes, ionomers containing ion exchange groups and cellulosic fibers are discussed in detail.

Ionomers

Figure 1:
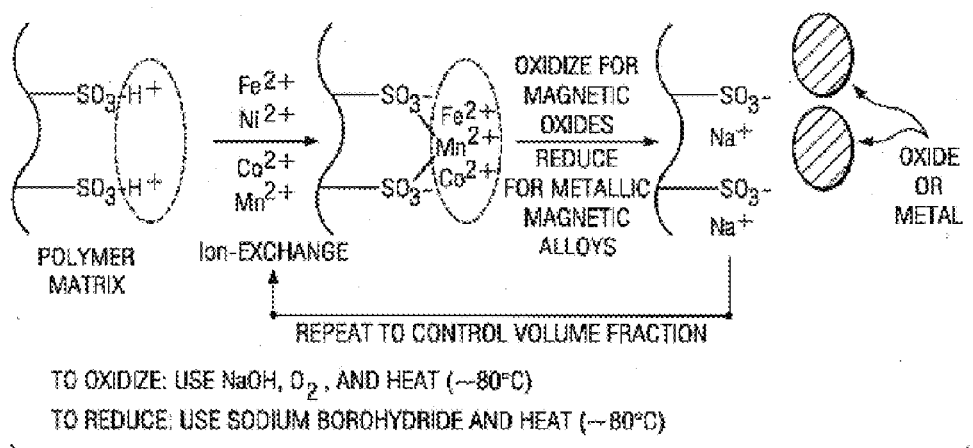
FIG. 1 shows a chemical reaction for synthesizing a nanocomposite within an ion exchange polymer matrix incorporating features of the invention.

While not intending that the process be limited by theory, FIG. 1 illustrates a preparative process believed to occur in the synthesis of nanocomposite materials starting from a polymer matrix of an ionomer containing ion-exchange groups such as widely used for water filtration and in fuel cells. It is typically sold under various trade names including Nafion®, Dowex®, etc. The matrix is based on sulfonated Teflon polymer chains with hydrogen ions balancing the charge. The nanoscale magnetic and magneto-optic materials are synthesized within the polymer matrix using ion exchange and chemical precipitation procedures at a temperature of about 60° C. The polymer matrix restricts the agglomeration of the nanoparticles that form and maintains the nanoparticles to within confined areas of the host matrix. The concentration of nanoparticles within the matrix can be increased by repeating the ion exchange and precipitation procedures and thus provides a means for controlling the volume fraction of nanoparticles. This procedure also provides a means for synthesizing different materials within the same host matrix—e.g. dielectric and magnetic nanoparticles to yield magnetodielectric materials. Addition of a few drops of hydrogen peroxide results in the direct precipitation of metal oxides. Metallic magnetic materials can also be synthesized using the ion-exchange method with subsequent reduction of ions to metallic state using sodium borohydide. Stretching the host matrix in the form of fibers or films gives rise to elongated areas within which the nanoparticles precipitate and thus also provides a means for controlling the nanoparticle shape. This may be necessary in some applications to increase magnetic permeability.

The sulfonated Teflon® polymer, Nafion® has the formula:

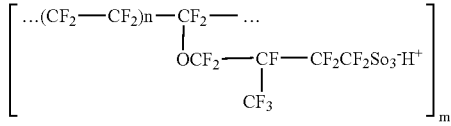

where a portion of that polymer chain is represented by:

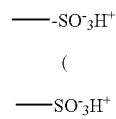

When a matrix composed of sulfonated polymer is placed in an aqueous solution of a soluble metal salt, $H^+$ ions on the polymer side chains are replaced, in an ion exchange reaction, by the metal ions, for example $Fe^{2+}$, $Ni^{2+}$, $Co^{2+}$, $Mn^{2+}$, from the solution. However, other metallic ions of a lesser or greater volume can also be used. The resultant polymer with bound metal ions can then be heated at temperatures from about 20° C. to about 100° C., preferably around 60° C.-80° C., with alkali metal hydroxides, such as sodium hydroxide or potassium hydroxide. This results in the $Na^+$ or $K^+$ replacing the metal ion and the formation of metal oxides in the form of nanocomposites entrapped within the polymer matrix. Alternatively, rather than oxidizing the sulfonate polymer, it may be reduced, for example by using sodium borohydide, to form metallic alloys. While elevated temperatures result in an increased reaction rate, the reaction may be further accelerated as a result of a substantially increased ionic mobility of the metal ions. Examples of suitable metal salts include, but are not limited to soluble salts of iron, cobalt, nickel, magnesium, vanadium, chromium and zinc. These soluble salts can be in the form of chlorides, iodides, bromides, fluorides, sulfates, acetates, nitrates, perchlorates, thiocyanates, thiosulfates and the like. However, one skilled in the art will recognize the soluble salts with anions and cations may be that used in the described procedure. Preferred salts include $Fe^{2+}$, $Ni^{2+}$, $Co^{2+}$, $Mn^{2+}$, $Fe^{3+}$, and $Zn^{2+}$. These salts may also be provided alone or in combination. When combined, mixtures of oxides or bimetallic oxides (or tri-metallic or multimetallic oxides) designated as MO can result. Typical nanocomposites produced include $Fe_2O_3$, $MnFe_2O_4$, $CoFe_2O_4$, $NiFe_2O_4$, Ni—Fe alloys and ZnO.

While FIG. 1 shows the starting polymer matrix to contain $H^+$ ions, other soluble exchangeable ions may be used. For example, the $Na^+$ containing molecule shown as the end product in FIG. 1 can be recycled and used as the starting material for exchange with the metal ion.

Figure 2:
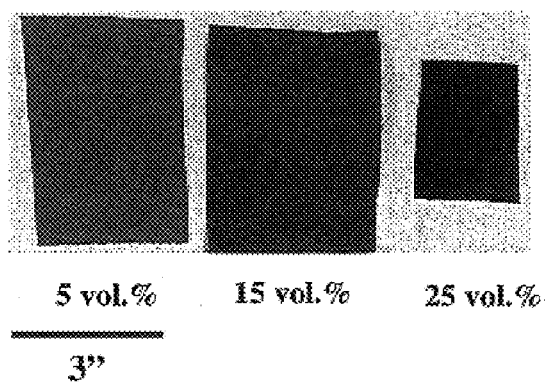
FIG. 2 is a color photograph showing the effect of nanoscale particles present at increasing concentrations synthesized in a matrix using the synthesis procedure of FIG. 1.

FIG. 2 is a series of colored photographs showing a nanocomposite of $MnFe_2O_4$ formed within a polymer film according to the above described procedure with the film containing 5%, 15% and 25% by volume of the $MnFe_2O_4$ nanoparticles. The film was colorless prior to treatment. The nanoparticles or nanocrystals are from 5 to 10 nm in size. The volume fraction of the nanocrystals is increased by repeating the ion exchange and precipitation procedures. The increase in nanoparticle concentration is readily apparent by the deepening of the red color of the polymer film with increased concentration.

Figure 3:
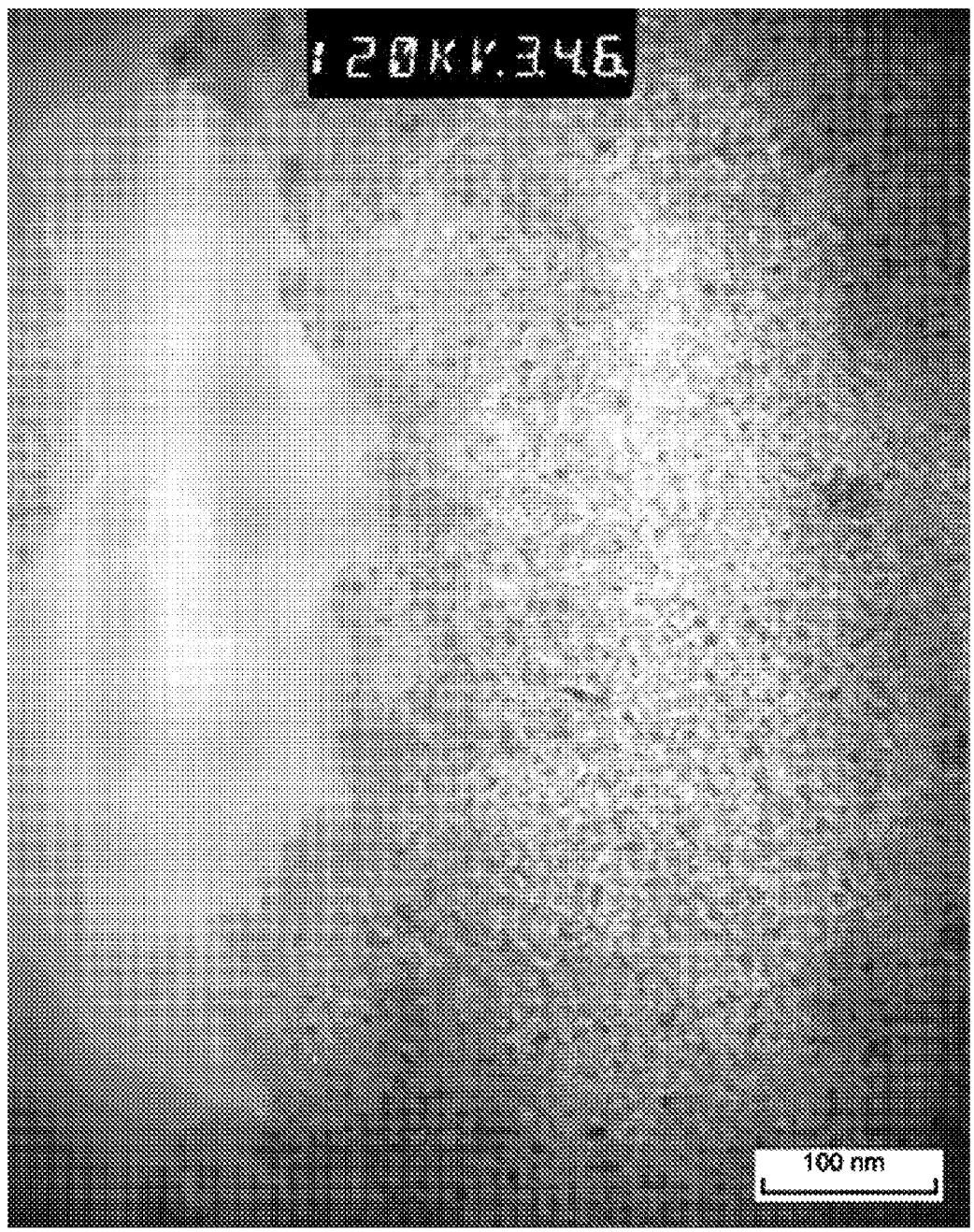
FIG. 3 is an electron micrograph of the 5% by volume sample shown in FIG. 2.

FIG. 3 is an enlarged view of nanocrystals of 5% $MnFe_2O_4$ by volume in a polymer film.

Cellulosic Precursor

Cellulosic materials such as cotton, linen, rayon and paper products may be used as starting materials. Alternatively, the technique includes oxidation of the hydroxyl groups to carboxylate groups followed by ion exchange and precipitation within a cellulosic structure. The structure could be in the form of pre-spun fibers, yarns, woven and non-woven textiles, wood, raw cotton, cotton bolls, paper or cardboard. The nanomaterials can be dielectric or magnetic. Magnetic functionality includes soft and hard magnets, or magnetoresistive, or magnetostrictive materials. Such nanocomposites are expected to provide improved materials for various additional applications such as— a. functional conformable materials
b. micro-magnetics for power generators in cloth forms (clothing, canvas covers, etc.)
c. actuators for valves, and micropumps, electrical switches and micro-mirrors
d. memory storage devices
e. bar-coding (potentially invisible)
f. proximity or direction sensors
g. capillary peristaltic pumps
h. controlled displacement or positioning devices including macro and micro devices.

Figure 4:
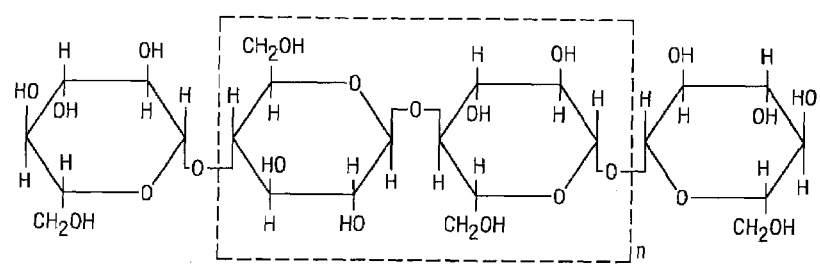
FIG. 4 is the generalized chemical structure of a cellulosic starting material for use in a process incorporating features of the invention.

FIG. 4 shows the generalized chemical structure of cellulosic materials, which are polymeric hydrocarbon non-aromatic six membered rings linked by oxygen atoms. Each ring contains a primary alcohol group —$CH_2OH$.

These primary alcohols can be converted to potassium carboxylate groups by oxidation with oxidizing agents such as potassium permanganate,

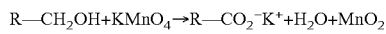

where R—$CH_2OH$ represents a repeating section of the cellulosic polymer.

The remainder of the process is similar to the procedure described above. The potassium ions are "ion exchanged" with other metal ions followed by precipitation and agglomeration. A soluble metal salt is ion-exchanged with the potassium in the carboxylated cellulose as follows:

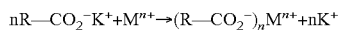

where M can be $Fe^{2+}$, $Fe^{3+}$, $Co^{2+}$, $Ni^{2+}$, $Mn^{2+}$, $Zn^{2+}$, or a variety of other metal a combination of such metal ions, where the metals form insoluble oxides. After ion exchange, the metal ion is reacted with an alkali metal base such as sodium hydroxide in air,

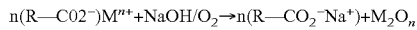

to form the oxide. A 60° C. processing temperature is a preferred temperature. However, different temperatures in the range of from about 20° C. to about 100° C. may be more efficient due to the greater basicity of the carboxylate group compared to the sulfonate group described above. This process can be repeated indefinitely to increase the size and/or concentration of nanoparticles within the cellulosic matrix.

As with the process using the sulfonated polymer described above, reduction with sodium borohydrate yields metallic nanoparticles.

Unlike the sulfonated Teflon polymer, there are no physical bounds to particle growth in the cellulosic substrate. The nanoparticles will grow within the fiber or yarn structure. Size and concentration are controlled by reaction conditions including reactant concentration, reaction time and temperature, and the number of repetitions.

Figure 5:
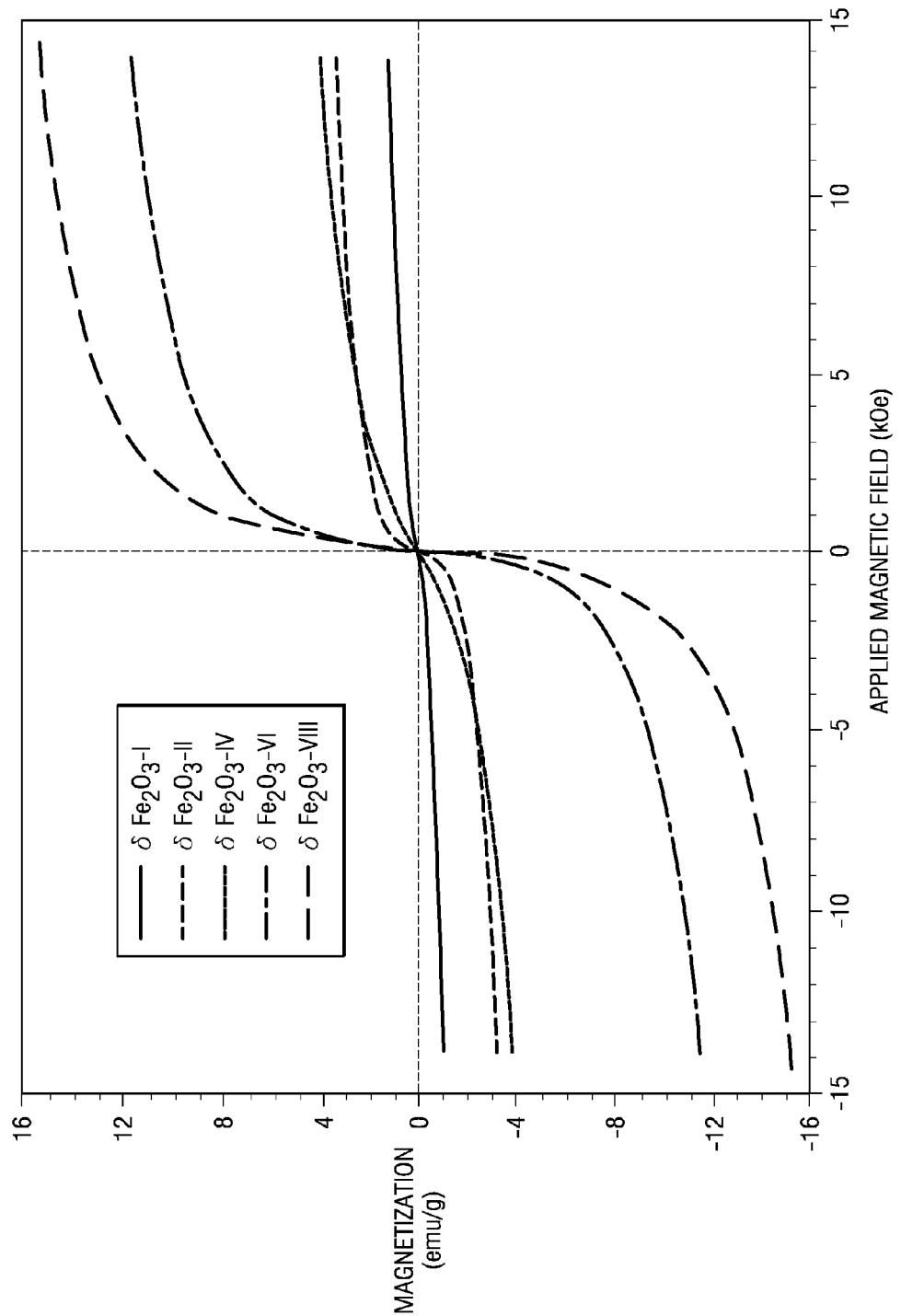
FIG. 5 is a graph showing the change in magnetic properties resulting from producing larger $Fe_2O_3$ nanoparticles in a matrix by repeating the deposition cycle at least 8 times.
Figure 6:
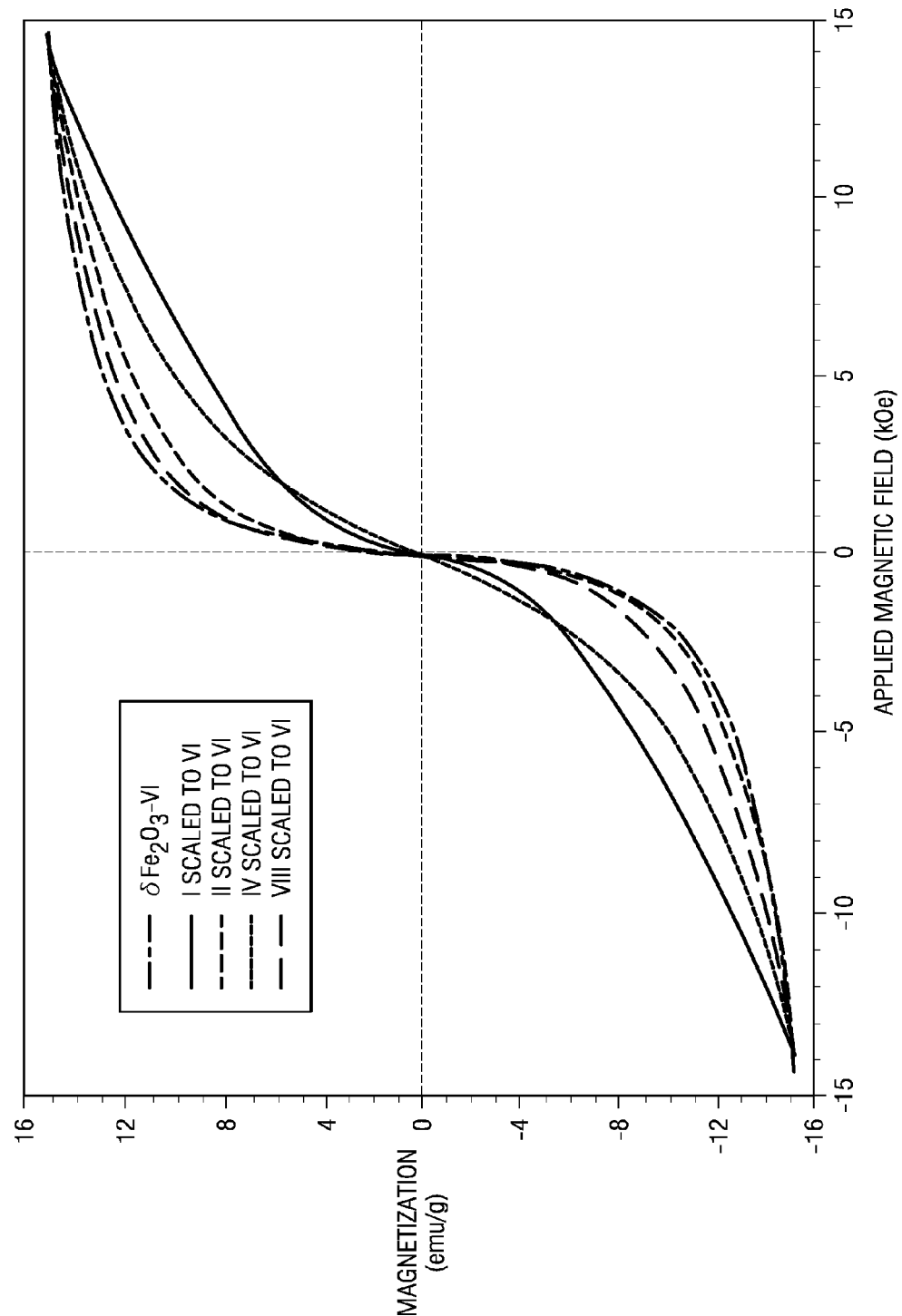
FIG. 6 is the graph of FIG. 5 with each cycle normalized to the sixth cycle.
Figure 7:
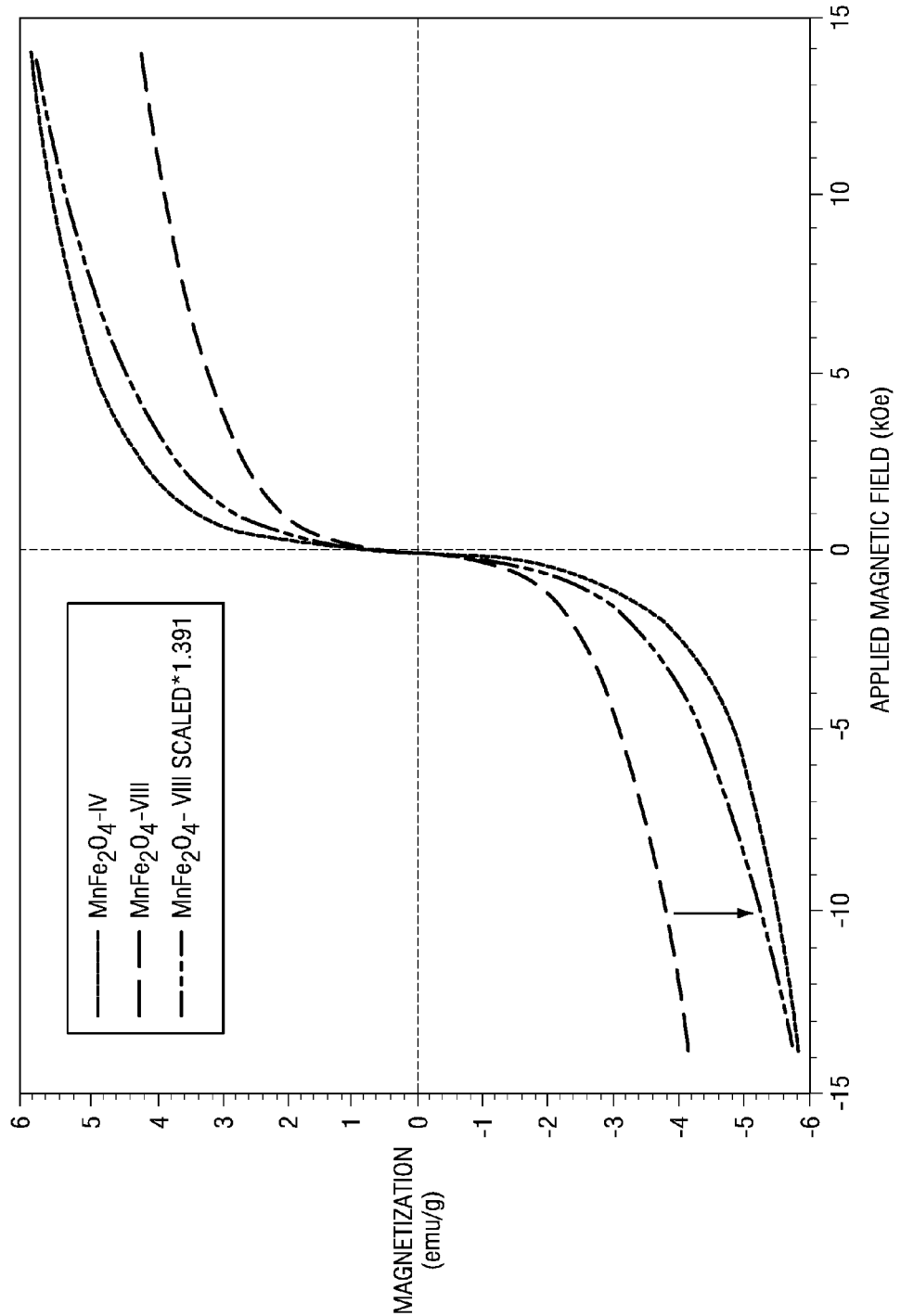
FIG. 7 is a graph showing the change in magnetic properties resulting from producing larger $MnFe_2O_4$ nanoparticles in a matrix by repeating the deposition cycle at least 8 times.
Figure 8:
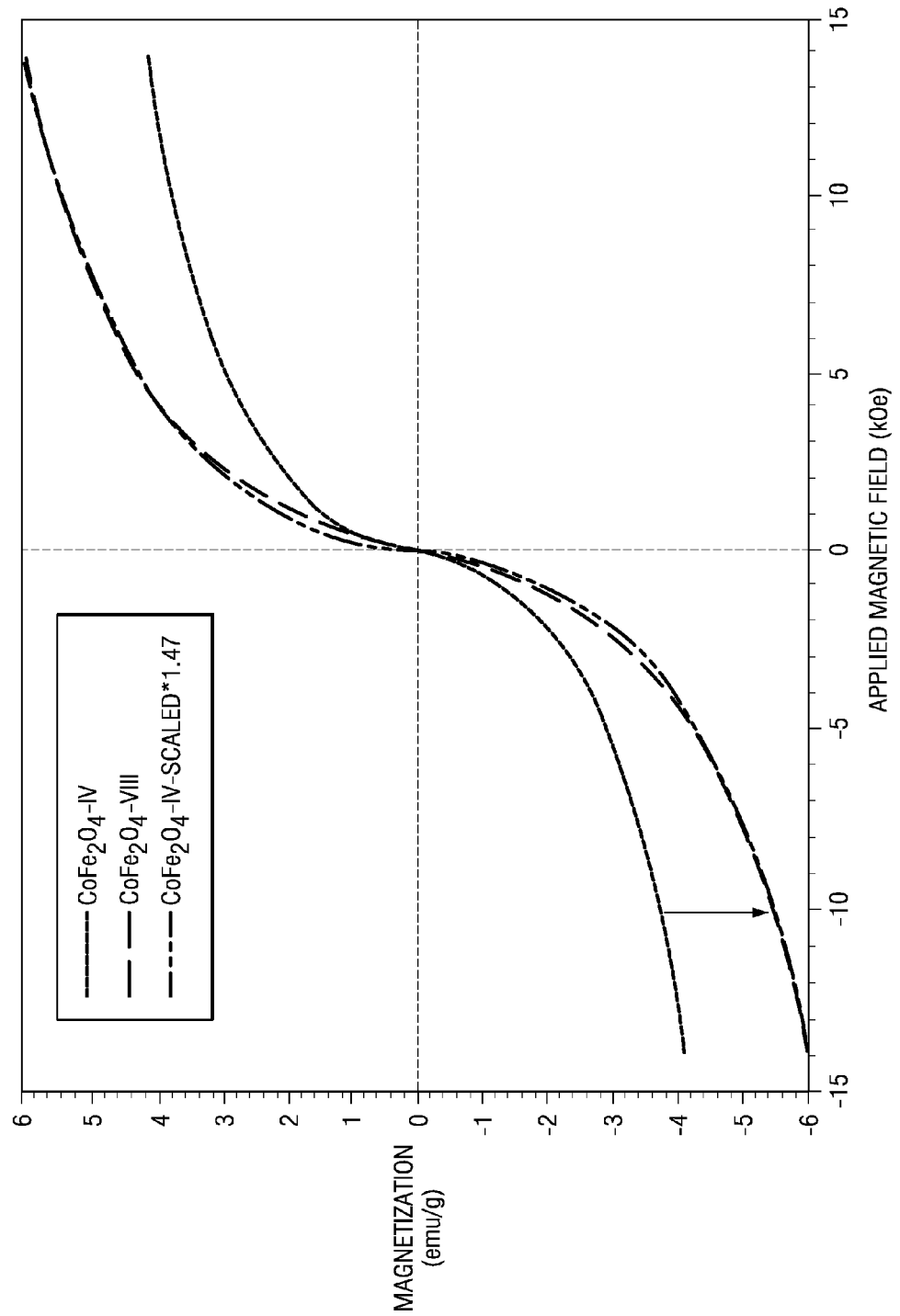
FIG. 8 is a graph showing the change in magnetic properties resulting from producing larger $CoFe_2O_4$ nanoparticles in a matrix by repeating the deposition cycle at least 8 times.

FIGS. 5 and 6 illustrates the change in magnetic properties for a series of films of Nafion containing increasing concentrations of iron oxide nanocomposite, from approximate 1% to 16% by weight, as a result of repeating the process described above multiple times, in this instance 1, 2, 4, 6 and 8 repetitions. The increase in concentrate was initially estimately to be approximately 2% repetition. FIG. 6 shows the other curves normalized to the curve for 6 repetitions. FIG. 7 compares the magnetic properties for Nafion—$MnFe_2O_4$ films with $MnFe_2O_4$ (4 repetitions) and $MnFe_2O_4$ (8 repetitions with the 8 repetition curve scaled 1.391 times). While the process was expected to procedure 2% for each repetition, in reality, it was found to produce 1.39% per repetition. In a like manner, FIG. 8 compares the magnetic properties for Nafion—$CoFe_2O_4$ films with $CoFe_2O_4$ (4 repetitions) and $CoFe_2O_4$ (8 repetitions), When the curves scaled 1.47 times the curve is substantially the same for the IV and VIII repeated $CoFe_2O_4$ nanocomposite film, each repetition thus yielding about 1.47%, similar to the $MnFe_2O_4$ nanocomposite film, These graphs demonstrate that there is no effect of loading concentrations on magnetic properties.

As indicated above, this procedure also provides a means for synthesizing different materials and combinations of materials within the same host matrix. Further, different metal oxides can be deposited in subsequent cycles of the process. For example, and solely for illustrative purposes, $Fe_2O_3$ can be deposited in early stages followed by $NiFe_2O_4$ which may then be followed by $CoFe_2O_4$. In this manner, a flexible matrix with specifically designed magnetic properties or functions from different materials can be constructed.

Other metallic magnetic materials as well as other unique compositions or alloys can then be produced by reduction of matallic ion. As an example, by reacting the iron-exchanged composite with sodium borohydride ($NaBH_4$) magnetic materials such as permalloy (NiFe), samarium-cobalt, manganese-iron, cobalt-iron, or neodymium-boron can be formed. The borohydride can also reduce the carboxylate and hydroxyl groups in the cellulosic structure resulting in various different cellulosic reaction products, resulting from, but not limited to, cleavage of the carboxyl group, crosslinking of the polymer, or combinations thereof.

In a typical synthesis starting with a substrate of a Nafion proton exchange membrane (5 to 10 cm (2" to 4") square with a thickness of 50 micrometers (0.002")) or perfluorosulfonic acid polymer beads or fiber (30-40 g of substrate), the following procedure was used:

1. The substrate material is ion exchanged at room temperature with stirring for 1 hour. typically in 400 ml aqueous solution. Examples of the solutions used for specific nanomaterials are:

| Solution Composition | MetalOxide or Metallic Alloy Produced |
|---|---|
| 1:1 ratio of 0.05 M $MnCl_2$, and 0.1 M $FeCl_2$ | $MnFe_2O_4$ |
| 1:2 ratio of 0.05 M $Co(NO_3)_2$ and 0.1 M $FeCl_2$ | $CoFe_2O_4$ |

-continued

| Solution Composition | MetalOxide or Metallic Alloy Produced |
|---|---|
| 0.1 M FeCl$_2$ | Fe$_2$O$_3$ |
| 0.0358 M FeCl$_2$ and 0.1368 M NiSO$_4$ | NiFe (80% Ni) alloy |
| 0.1 M Zn (NO$_3$)$_2$ - (note: ZnO is non-magnetic; however, it is phosphorescent) | ZnO |

2. After ion exchange the substrate is washed thoroughly using deionized water.
3. To produce CoFe$_2$O$_4$, Fe$_2$O$_3$, or ZnO,
   20 ml of 12 M NaOH with 2 ml 10% H$_2$O$_2$ (hydrogen peroxide) is then added dropwise into the ion-exchanged material at 80° C. The H$_2$O$_2$ ensures that the Fe(II) is oxidized to Fe(III). The substrate is then heated for about 30 minutes to complete the reaction.

The substrate is then washed thoroughly using deionized water preferably 7-10 times. The steps above are repeated to increase nanoparticle loading. For example, 20 repetitions results in 30% to 45% by volume loading of the nanomaterial. The percentage by weight is much higher since the density of the nanomaterials is greater than the polymer.

4. For MnFe$_2$O$_4$, 12M NaOH is used without the hydrogen peroxide.
5. For 80% Ni-20% Fe alloy, after reaching the desired conposition upon ion-exchange, the product is reduced using 30 ml of 2.5 M NaBH$_4$ (sodium borohydride).

Using a 2"-3" square of a prewashed textile composed of cellulosic fibers (a fine cotton weave, 90 picks/inch) as a substrate, the substrate material is prepared by oxidizing the —OH (hydroxyl) groups in cellulose to —COOH (carboxylic acid groups).

This is accomplished in two steps. First, the cellulose is oxidized with aqueous KMnO$_4$ (typically 0.05 M). This yields the carboxylate salt RCOO$^-$K$^+$ where R is the cellulosic backbone

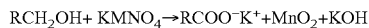
RCH$_2$OH+ KMNO$_4$→RCOO$^-$K$^+$+MnO$_2$+KOH

The carboxylate is then converted to the acid form

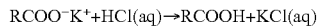
RCOO$^-$K$^+$+HCl(aq)→RCOOH+KCl(aq)

The procedure used for the Nafion or perfluorosulfonic acid polymer described above is then used to precipitate ion-oxide particles within the fibers of the fabric. Ion exchange typically requires 12 hrs for completion rather than 1 hour as above. Two reasons for this difference are that the carboxylic acid proton is less mobile than the protons in highly cationic ion-exchange polymers, and the capacity for ion exchange in the cellulosic material is much lower.

While the process above is described for specific soluble metallic salts, one skilled in the art will recognized that the process may be used for a broad range of soluble metallic salts which may be converted to insoluble forms (i.e. insoluble oxides) by subsequent reactions. Also, one skilled in the art will recognize that the described process is not limited to the production of matrix materials with magnetic properties. A broad range of metals or metal containing precipitates can be formed within the matrix for numerous other applications, including, but not limited to phosphorescent materials, energy absorbing materials (i.e., electromagnetic, nuclear radiation), semiconductors or high strength composites or precursors for those composites.

One skilled in the art will also recognize that the precursor materials are not limited to the ionomers or cellulosic materials described. Other polymeric materials with reactive pendant replaceable groups (i.e., H$^+$ Na$^+$, K$^+$ etc.) —OH, COOH, or groups replaceable with other pendant groups which will react with or exchange with cations in the metal salt may be used. Examples of other useable polymer substrates include polyamides, epoxies, polyurethanes, vinyl, phenolics and polyester resins.

The processes described above result in magnetic or magnetodielectric nanocomposites processed directly into final shapes such as fibers, films, tubes and textile sheets. No machining, tape casting or other processes are required. This provides the ability to directly make a nanocomposite in a final desired shape in one processing step. While powders of nanocomposites made by ion-exchange and precipitation are shown in the literature, they are not suitable for use in the formation of finished shapes since further processing to form these shapes requires mixing and dilution with a binder or other polymer and heating to make a solid body. This causes nanoparticles to grow and the superior magnetic properties will cease to exist.

The shape, size and volume fraction of the magnetic and magnetodielectric nanoparticles embedded in the polymer matrix have a profound effect on its final properties. The process described herein allows for control of the nanoparticle shape, size and volume fraction. The nanocomposite powders (or beads) made by prior art techniques only yield spherical particles because the shape of the ionic cluster is spherical. The spherical shape is not desirable for increasing the magnetic permeability or dielectric constant of nanocomposites. In fibers, films and tubes the ionic cluster is ellipsoidal due to stretching and this yields ellipsoidal nanoparticles, with the permeability higher in one direction. The interaction between the nanoparticles is determined by the spacing between them and their volume fraction, both of which can be increased in the process described by repeating the ion exchange and precipitation procedures. This also has a profound effect on permeability, permittivity, saturation flux density, and loss. The process described provides the ability to synthesize magnetic nanoparticles in a magnetic field or ferroelectric nanoparticles in an electric field, thus imparting anisotropy, which is desirable for certain applications.

Mixed compounds (such as MnFe$_2$O$_4$) and alloys (such as Ni—Fe) can be made by this process due to the close proximity of ion-exchange sites in the polymer. As an example, the process can provide mixed compounds rather than separate MnO and Fe$_2$O$_3$ nanoparticles or separate Ni and Fe nanoparticles. Mixed compounds form spinels and therefore have much higher magnetization (or dielectric constant in case of ferroelectric nanoparticles) than individual compounds. Unique alloys, for example such as samarium-cobalt or neodymium-iron-boron, can be produced by using solutions of mixed soluble salts are sequentially applying different salt solutions. By utilizing excess borohydride, some boron may also be incorporated in the end product.

Also, mixtures of either mixed or simple compounds can be made. This is a unique feature of the process described herein which is not shown in the prior art. In other words, one can make compound A in a first procedure and then make compound B adjacent to compound A in a second step. As an example, nanocomposite magnetodielectrics can be synthesized. The presence of an electric field in a ferroelectric nanoparticle adjacent to ferromagnetic or ferrimagnetic nanoparticle can accentuate the permeability and permittivity in ways that the individual compounds do not exhibit. In a like manner, red, green and blue nanophosphors can be synthesized in the same polymer film rather than requiring three separate films to yield white light.

These nanocomposite films also have conformability and flexibility. No prior art process has been demonstrated which is capable of producing high performance magnetic and magnetodielectric materials that are flexible. Prior available pure ceramics or metals and composites are either brittle or exhibit large losses at high frequency, and pure polymers do not exhibit large enough permittivity or permeability. Composites made by prior art techniques of mixing polymers with ceramic or metallic functional materials are restricted to low volume fractions (10-20%) which are not high enough to make high performance conformable materials. The processes described can produce conformable nanocomposites with suitable properties having 40-50% v metallic or metal oxide functional nanomaterials. These nanocomposite films also preserve the mechanical strength and thermal stability of the matrix material because of reinforcement provided by the nanocrystallites in the composite so formed.

It has been also found that the nanocomposite films produced by processes incorporating features of the invention swell or expand as nanoparticles are deposited therein. This allows for further loading of additional functional nanoparticles without agglomeration. This allows the synthesis of magnetic and ferroelectric nanoparticles in close proximity to each other, imparting certain properties not found in prior produced individual phases.

The nanocomposite fibers made by the process set forth herein can be embedded into cotton textiles or the cotton textile itself can be rendered magnetic or magnetodielectric. As a result, the process has the ability for forming ferroelectric and ferromagnetic (or ferrimagnetic) nanoparticles in cotton to provide electronic textiles usable for antennas, power converters, EMI suppression, etc. Using $Zn+^2$ salts (for example Nitrate or chloride salts) as starting materials, the procedures described herein also allow direct synthesis of monolithic films of Nafion or cellulosic with concentrations of up to about 20% of phosphorescent nanoparticules. These films have been demonstrated to emit visible light when exposed to UV light. Phosphorescent nanoparticles deposited by the process described possess higher luminescent efficiency then the same materials in bulk. Further, high refractive index nanoparticles can be synthesized in the film along with the phosphor nanoparticles, providing higher efficiency light coupling. Still further, multiple different colored phosphors, such as red, green and blue phosphors can be synthesized within the same film, thus allowing white light emission from a monochromatic light source.

While the invention is primarily directed to the formation of magnetic materials, the teachings herein are applicable to a broad range of metals or combinations of metals which form soluble salts, for example Ga, AgAs, Se, InSb and Si. These metals can be attached to the polymer in a like manner using a borohydride or more active reducing agents as a reducing agent. It is also not necessary to limit the process to aqueous solutions; other solvents can be used as long as they do not negatively affect the substrate material. Still further, using the described process it is possible to produce elongated particles by subjecting the polymer substrate to tension, or drawing the polymer into elongated fibers during the formation process.

We claim:

1. A nanocomposite comprising a metal oxide and an ionomeric or cellulosic polymer matrix, wherein said metal oxide is formed as phosphorescent ZnO nanoparticles including an ion exchange and precipitation procedure within said ionomeric or cellulosic polymer matrix.

2. The nanocomposite as recited in claim 1 wherein said ionomeric or cellulosic polymer matrix comprises a polymer matrix having ion exchange groups.

3. The nanocomposite as recited in claim 2 wherein said polymer matrix having ion exchange groups comprises sulfonated polymer chains with hydrogen ions balancing a charge.

4. The nanocomposite as recited in claim 2 wherein a volume fraction of nanoparticles within said polymer matrix is controlled by repeating said ion exchange and precipitation procedure.

5. The nanocomposite as recited in claim 1 wherein said cellulosic polymer matrix comprises one of cotton, linen, rayon and paper products.

6. The nanocomposite as recited in claim 1 wherein said cellulosic polymer matrix is formed by oxidizing hydroxyl groups to carboxylate groups followed by an ion exchange and precipitation procedure within said cellulosic polymer matrix.

7. A method of forming a nanocomposite, comprising:
   contacting an ionomeric or cellulosic polymer matrix with a solution of zinc ions by an ion exchange and precipitation procedure, thereby attaching said zinc ions to said ionomeric or cellulosic polymer matrix; and
   oxidizing said zinc ions with an alkali base, thereby dispersing a zinc oxide as phosphorescent ZnO nanoparticles throughout said ionomeric or cellulosic polymer matrix.

8. The method as recited in claim 7 wherein said ionomeric or cellulosic polymer matrix comprises a polymer matrix having ion exchange groups.

9. The method as recited in claim 8 wherein said polymer matrix having ion exchange groups comprises sulfonated polymer chains with hydrogen ions balancing a charge.

10. The method as recited in claim 8 wherein a volume fraction of nanoparticles within said polymer matrix is controlled by repeating said ion exchange and precipitation procedure.

11. The method as recited in claim 7 wherein said cellulosic polymer matrix comprises one of cotton, linen, rayon and paper products.

12. The method as recited in claim 7 wherein said cellulosic polymer matrix is formed by oxidizing hydroxyl groups to carboxylate groups followed by said ion exchange and precipitation procedure within said cellulosic polymer matrix.

13. A nanocomposite comprising a metallic alloy and an ionomeric or cellulosic polymer matrix, wherein said metallic alloy is formed as nanoparticles including an ion exchange and precipitation procedure within said ionomeric or cellulosic polymer matrix, wherein said metallic alloy is magnetic, phosphorescent or magnetodielectric and is selected from the group consisting of Ni—Fe, Sm—Co, Mn—Fe, Co—Fe, and combinations thereof.

14. The nanocomposite as recited in claim 13 wherein said metallic alloy is formed by reducing metal ions with a reducing agent, thereby dispersing said metallic alloy as nanoparticles throughout said ionomeric or cellulosic polymer matrix.

15. The nanocomposite as recited in claim 13 wherein said ionomeric or cellulosic polymer matrix comprises a polymer matrix having ion exchange groups.

16. The nanocomposite as recited in claim 15 wherein said polymer matrix having ion exchange groups comprises sulfonated polymer chains with hydrogen ions balancing a charge.

17. The nanocomposite as recited in claim 15 wherein a volume fraction of nanoparticles within said polymer matrix is controlled by repeating said ion exchange and precipitation procedure.

18. The nanocomposite as recited in claim 13 wherein said cellulosic polymer matrix comprises one of cotton, linen, rayon and paper products.

19. The nanocomposite as recited in claim 13 wherein said cellulosic polymer matrix is formed by oxidizing hydroxyl groups to carboxylate groups followed by said ion exchange and precipitation procedure within said cellulosic polymer matrix.

20. A method of forming a nanocomposite, comprising:
contacting an ionomeric or cellulosic polymer matrix with a solution of first and second metal ions, thereby attaching said first and second metal ions to said ionomeric or cellulosic polymer matrix; and
reducing said first and second metal ions with a reducing agent, thereby dispersing a metallic alloy as nanoparticles throughout said ionomeric or cellulosic polymer matrix, wherein said metallic alloy is magnetic, phosphorescent or magnetodielectric and is selected from the group consisting of Ni—Fe, Sm—Co, Mn—Fe, Co—Fe, and combinations thereof.

21. The method as recited in claim 20 wherein said reducing agent comprises $NaBH_4$.

22. The method as recited in claim 20 wherein said ionomeric or cellulosic polymer matrix comprises a polymer matrix having ion exchange groups.

23. The method as recited in claim 22 wherein said polymer matrix having ion exchange groups comprises sulfonated polymer chains with hydrogen ions balancing the charge.

24. The method as recited in claim 22 wherein a volume fraction of nanoparticles within said polymer matrix is controlled by repeating said ion exchange and precipitation procedure.

25. The method as recited in claim 20 wherein said cellulosic polymer matrix comprises one of cotton, linen, rayon and paper products.

26. The method as recited in claim 20 wherein said cellulosic polymer matrix is formed by oxidizing hydroxyl groups to carboxylate groups followed by said ion exchange and precipitation procedure within said cellulosic polymer matrix.

* * * * *

UNITED STATES PATENT AND TRADEMARK OFFICE
CERTIFICATE OF CORRECTION

PATENT NO. : 7,431,862 B2  
APPLICATION NO. : 10/837552  
DATED : October 7, 2008  
INVENTOR(S) : Mehrotra et al.

Page 1 of 2

It is certified that error appears in the above-identified patent and that said Letters Patent is hereby corrected as shown below:

On the Title Page, Section (56) References Cited, OTHER PUBLICATIONS, 1st entry, delete "Trnasparent" and insert --Transparent--.
On the Title Page, Section (56) References Cited, OTHER PUBLICATIONS, 2nd entry, delete "nanocmposites" and insert --nanocomposites--.
On the Title Page, Section (56) References Cited, OTHER PUBLICATIONS, 3rd entry, delete "Funametals" and insert --Fundamentals--.
In the drawings, Figure 2, delete the solid line from above 3".
In the drawings, Figure 2, delete "3"" and insert --|←3"→|--.
In the drawings, Figure 2, above FIG. 2, insert --$MnFe_2O_4$ IN POLYMER MATRIX--.
In the drawings, Figure 2, over top right corner of rectangle, insert --STARTING POLYMER--.
In Col. 1, line 17, after al. insert --,--.
In Col. 1, line 19, delete "Composites"," and insert --Composites,"--.
In Col. 1, line 21, after al. insert --,--.
In Col. 1, line 23, delete "Temperature"," and insert --Temperature,"--.
In Col. 1, line 35, delete "*material*"," and insert --*material,*"--.
In Col. 1, line 42, delete "*Precipitation*"," and insert --*Precipitation,*"--.
In Col. 1, line 49, delete "*Nanocomposites*"," and insert --*Nanocomposites,*"--.
In Col. 2, line 24, delete "starting there though" and insert --therethrough starting--.
In Col. 4, line 49, after cations insert --that--.
In Col. 4, line 50, delete "that".
In Col. 5, line 16, delete "bolls" and insert --balls--.
In Col. 5, line 55, after other metal insert --ions, or--.
In Col. 6, line 10, delete "illustrates" and insert --illustrate--.
In Col. 6, line 11, before films insert --nanocomposite--.
In Col. 6, line 12, delete "nanocomposite," and insert --nanoparticles--.
In Col. 6, line 12, delete "approximate" and insert --approximately--.
In Col. 6, line 16, before repetition insert --by weight per--.
In Col. 6, line 18, after $MnFe_2O_4$ insert --nanocomposite--.
In Col. 6, line 21, delete "procedure" and insert --produce--.
In Col. 6, line 25, delete "," and insert --.--.
In Col. 6, line 25, after curves insert --are--.

Signed and Sealed this

Twenty-second Day of June, 2010

David J. Kappos  
*Director of the United States Patent and Trademark Office*

CERTIFICATE OF CORRECTION (continued)
U.S. Pat. No. 7,431,862 B2

In Col. 6, line 25, after times insert --,--.
In Col. 6, line 29, delete "film," and insert --films.--.
In Col. 6, line 41, delete "then" and insert --also--.
In Col. 6, line 42, delete "matallic ion" and insert --metallic ions--.
In Col. 6, line 42, delete "iron" and insert --ion--.
In Col. 6, line 52, delete "square" and insert --squares--.
In Col. 6, line 54, delete "fiber" and insert --fibers--.
In Col. 6, line 57, delete "hour." and insert --hour,--.
In Col. 7, line 20, after water insert --,--.
In Col. 7, line 28, delete "conposition" and insert --composition--.
In Col. 7, line 53, delete "recognized" and insert --recognize--.
In Col. 8, line 52, delete "are" and insert --or--.
In Col. 9, line 26, delete "nanocomposite fibers" and insert --nanoparticles--.
In Col. 9, line 36, delete "nanoparticules" and insert --nanoparticles--.
In Col. 9, line 40, delete "then" and insert --than--.
In Col. 9, line 42, delete "phosphor" and insert --phosphorescent--.